(12) United States Patent
Gliksberg et al.

(10) Patent No.: US 11,431,610 B2
(45) Date of Patent: Aug. 30, 2022

(54) RAPID METHOD FOR ESTABLISHING COMMUNICATION ROUTES BETWEEN COMPUTERS OF A SUPERCOMPUTER

(71) Applicant: BULL SAS, Les Clayes-sous-Bois (FR)

(72) Inventors: John Gliksberg, Bruyères-le-Châtel (FR); Antoine Capra, Brétigny-sur-Orge (FR); Alexandre Louvet, Rambouillet (FR)

(73) Assignee: BULL SAS, Les Clayes-sous-Bois (FR)

( * ) Notice: Subject to any disclaimer, the term of this patent is extended or adjusted under 35 U.S.C. 154(b) by 153 days.

(21) Appl. No.: 16/999,262

(22) Filed: Aug. 21, 2020

(65) Prior Publication Data

US 2021/0176163 A1  Jun. 10, 2021

(30) Foreign Application Priority Data

Aug. 23, 2019  (FR) ...................... 1909364

(51) Int. Cl.
| | | |
|---|---|---|
| G06F 15/16 | (2006.01) | |
| H04L 45/12 | (2022.01) | |
| H04L 45/02 | (2022.01) | |
| H04L 45/00 | (2022.01) | |
| H04L 45/48 | (2022.01) | |

(52) U.S. Cl.
CPC .............. *H04L 45/12* (2013.01); *H04L 45/02* (2013.01); *H04L 45/22* (2013.01); *H04L 45/48* (2013.01); *H04L 45/70* (2013.01)

(58) Field of Classification Search
CPC ......... H04L 45/12; H04L 45/02; H04L 45/22; H04L 45/48; H04L 45/70; H04L 45/123; H04L 45/54; G06F 15/173
See application file for complete search history.

(56) References Cited

U.S. PATENT DOCUMENTS

2019/0260645 A1  8/2019  Gliksberg et al.

FOREIGN PATENT DOCUMENTS

| EP | 3 107 253 A1 | 12/2016 |
|---|---|---|
| FR | 3 022 423 A1 | 12/2015 |

OTHER PUBLICATIONS

W. Alhoula and J. Hartley, "Static and time-dependent shortest path through an urban environment: Time-Dependent Shortest Path," 2014 Science and Information Conference, 2014, pp. 1027-1029, doi: 10.1109/SAI.2014.6918315. (Year: 2014).*

Dong-Chul Park, & Kyo-Reen Keum. (2009). A shortest path routing algorithm using hopfield neural network with an improved energy function. International Journal of General Systems, 38(7), 777-91. doi:http://dx.doi.org/10.1080/03081070902880433 (Year: 2009).*

(Continued)

*Primary Examiner* — Jeffrey R Swearingen
*Assistant Examiner* — Messeret F Gebre
(74) *Attorney, Agent, or Firm* — Arc IP Law, PC; Joseph J. Mayo

(57) ABSTRACT

A rapid method for establishing communication routes between computers of a supercomputer is presented. In this method, a certain number of characteristics of the network are pre-calculated, which are then used for the calculation of the routes. The calculation is based on simple arithmetic operations which makes it possible to be particularly rapid while remaining deterministic.

6 Claims, 2 Drawing Sheets

(56) References Cited

OTHER PUBLICATIONS

J. Wang, "A recurrent neural network for solving the shortest path problem," in IEEE Transactions on Circuits and Systems I: Fundamental Theory and Applications, vol. 43, No. 6, pp. 482-486, Jun. 1996, doi: 10.1109/81.503260. (Year: 1996).*

K. M. Borgwardt and H. P. Kriegel, "Shortest-path kernels on graphs," Fifth IEEE International Conference on Data Mining (ICDM'05), 2005, pp. 8 pp.-, doi: 10.1109/ICDM.2005.132. (Year: 2005).*

Search Report as issued in French Patent Application No. 1909364, dated Jun. 3, 2020.

* cited by examiner

[Fig. 3]
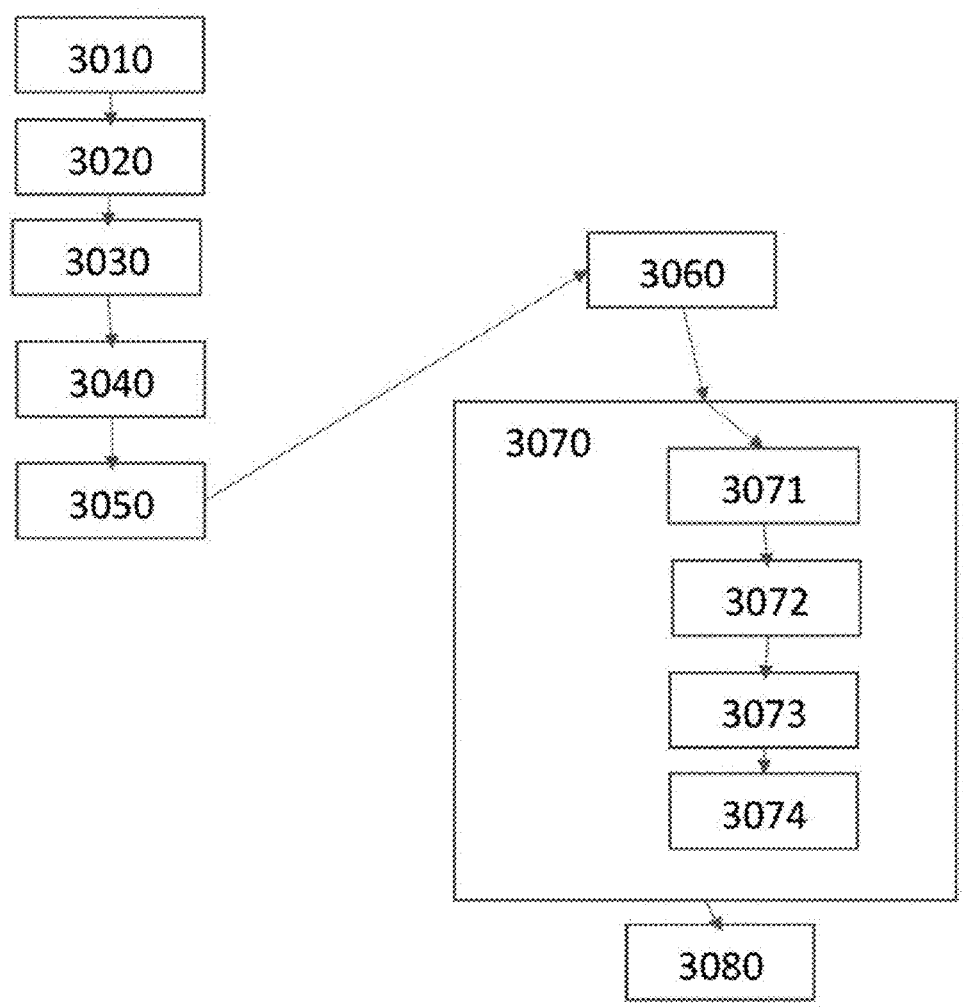

RAPID METHOD FOR ESTABLISHING COMMUNICATION ROUTES BETWEEN COMPUTERS OF A SUPERCOMPUTER

CROSS-REFERENCE TO RELATED APPLICATIONS

This application claims priority to French Patent Application No. 1909364, filed Aug. 23, 2019, the entire content of which is incorporated herein by reference in its entirety.

TECHNICAL FIELD OF THE INVENTION

The technical field of the invention is that of supercomputers also referred to as super calculators.

More particularly, the field of the invention is that of high-performance computers, also referred to as HPC computers or calculators.

The subject of the invention is a rapid method for establishing communication routes between computers of a supercomputer.

TECHNOLOGICAL BACKGROUND OF THE INVENTION

The supercomputers used for high-performance computing are composed of computers organized in cluster. These clusters are generally regular and, in most cases, organized into trees, of "fat tree" type. More generally, the organization of these clusters can be described as a regular superposition of connection trees.

The computers are connected to the leaves of this cluster and communicate via the branches or links (physically, cables connected to switches). A family of such organizations of networks (reference is made to "topologies") is of interest, since it makes it possible to precisely describe a majority or the existing supercomputers and is highly regular. These are Parallel Generalized Fat-Trees (PGFT) which are networks organized by levels, by groups, always with the same number of uplinks and downlinks, respectively, for all the switches at each level. This network organization also provides the guarantee that there is only one shortest path between each leaf and each root. This organization facilitates establishing communication routes and guarantees performance and the absence of deadlock. This deadlock absence guarantee is achieved if the routes are all "up-going-down-going", that is. composed first of an up-going phase then of a down-going phase according to the stagewise organization of PGFTs. For a perfect or degraded PGFT network, all the shortest paths between each pair of computers are up-going-down-going.

In order to meet the performance requirements indicated by supercomputer users, it is common for a supercomputer to contain at least approximately ten thousand switches. This means faults are a virtual certainty. Indeed, even if all the switches are reliable and have a fault probability of once per year, given the number of switches, this amounts to one fault per hour at the supercomputer level. The risk of faults of other elements of the supercomputers is also added to this. Thus, when the amount of equipment is large, the risk of faults becomes more common and it would be desirable to be tolerant thereof by reacting automatically.

For switches, this amounts to updating the routing tables sufficiently quickly not to interrupt the applications running. Here, sufficiently quickly means a total time of reaction to events of less than fifteen seconds. Thus, taking into account the fault detection times, the table send times, the routing table write times, and an amount of room for maneuver, such a route establishment time must be less than five seconds. In practice, the 15 second interval corresponds to a duration allocated by a supervisor to a device to make itself known, or else "give a sign of life". Beyond this period, the supervisor considers that the device is lost. The supervisor thus reallocates all the tasks of the lost device to other devices.

Knowing that, for machines of a very large size, the mean times between consecutive faults may be as small as to be at a similar order of magnitude to those of the maximum permitted reaction times, it would also be useful for the updating routes to be of a similar quality to those that could be calculated with a larger allocation of time.

If these conditions are not met, then any fault on a switch leads to a degradation of the performance of the supercomputer.

In practice, none of the known solutions meets these requirements. There are several types of methods for establishing communication routes applicable to such machines.

"Dmodk" is known, for example, described in 2010 in "D-Mod-K Routing Providing Non-Blocking Traffic for Shift Permutations on Real Life Fat Trees" by E. Zahavi. However, this solution only works if the network perfectly fits the PGFT description. These solutions can therefore no longer be used as soon as there is the slightest divergence, that is as soon as the first fault occurs.

"Random diff" is also known, described in 2016 by J.-N. Quintin and P. Vignéras in "Transitively Deadlock-Free Routing Algorithms". This solution rapidly calculates route changes in response to faults. However, the quality of the routes calculated becomes inexorably degraded, and re-establishing previously degraded hardware does not necessarily result in a re-establishment of the previously calculated routes. That is to say that, even in the case of a total restoration of the system to its initial operating state, the routes will no longer be optimal.

Solutions directly applicable to degraded PGFTs are also known, for example "Ftree" ("Optimized InfiniBand fat-tree routing for shift all-to-all communication patterns", 2009, E. Zahavi, G. Johnson, D. Kerbyson and M. Lang) and "UpDn" ("Current OpenSM Routing § UPDN Routing Algorithm", 2007, Intel; Mellanox; Voltaire; HNR Consulting). However, these solutions are too slow for the sizes of supercomputers being considered. Moreover, the quality of the routes produced becomes rapidly degraded, considering a successive number of incremental faults.

Finally, "SSSP" is known, described in 2009 in "Optimized Routing for Large-Scale InfiniBand Networks" by T. Hoefler, T. Schneider and A. Lumsdaine. This solution is not specific to a precise topology. In practice, this solution is even slower than the previous one. Moreover, for perfect PGFTs, it produces routes of an inferior quality to those of the previous solutions. As previously, the quality of the routes produced becomes degraded, considering a successive number of incremental faults.

SUMMARY OF THE INVENTION

The invention offers a solution to the problems mentioned above, by making it possible to recalculate in less than 5 seconds all the routes in a supercomputer comprising approximately ten thousand switches.

The invention is more particularly optimized for PGFTs, but it is applicable in a larger class of computer clusters in tree form or superimposed tree form, whether or not these trees are degraded.

The method according to the invention comprises a discovery step, in which the shortest paths of all switches to all computers is determined. During this step, an estimation is made for each switch of the number of switches on its level and in its group. This estimated number is denoted the divisor of the switch S and given the reference div(S). During this step, the computers are numbered contiguously. This numbering is preferably carried out according to a topologically optimal deterministic order, by groups of computers of the same or different types.

The method according to the invention comprises a step of calculating, to be applied for every switch to all the computers as destinations, of a path selection arithmetic rule from the shortest paths. Said arithmetic rule associates consecutive ports with consecutive destination numbers. The calculation step firstly favors ports to discrete switches over ports to the same switches. This enables, as far as possible, the regrouping of all the communications going to the same destination.

The method according to the invention also makes it possible, as sub-product of a step, to produce alternative routes.

One aspect of the invention relates to a method for establishing communication routes between computers of a supercomputer, the computers being interconnected via an interconnection network comprising a plurality of switches, each switch having a unique identifier, each switch comprising a plurality of ports, each port having a discrete number for the switch, characterized in that it comprises the following steps:

Associating, with each computer and with each switch, a unique identifier;

Associating, with each switch, a cost table, this table comprising a row for each leaf switch, each row comprising a cost corresponding to the number of switches to be used to reach the leaf switch from the switch associated with the cost table;

Associating, with each switch, a divisor based on the number of switches at the level thereof and in the group thereof;

Producing, for each switch, tables associating a group of ports of the switch with an identifier of a switch connected to these ports, the group being ordered by port number, the groups being ordered by switch identifier;

Associating with each computer a discrete number;

Assigning, for each leaf switch and for each computer connected thereto a deterministic route for the computer;

Producing, for each non-leaf switch, a routing table according to the following steps:

Producing, for each leaf switch, a set of groups of ports of the non-leaf switch, the groups of ports being those for which the cost table of the associated switch comprises a row corresponding to the leaf switch for which the cost is strictly less than the cost associated with the same leaf switch in the cost table of the non-leaf switch, if the set is not empty then for each computer connected to the leaf switch:

Selecting a group of ports from the set of groups of ports, the group selected having the index obtained by:

The function $\lfloor d/div(s) \rfloor \bmod \#c$, with $\lfloor \ \rfloor$ the integer part, d the computer identifier, div(s) the divisor associated with the switch, #c the number of groups in the set;

Selecting a port in the group of ports selected, the selected port being obtained by:

The function $$\left\lfloor \frac{d}{div(s) * \#c} \right\rfloor \bmod \#g,$$

with #g the number of ports in the group selected;

Creating a deterministic route of the non-leaf switch to the computer using the selected port;

Writing the deterministic routes into the switches.

In addition to the characteristics which have just been mentioned in the preceding paragraph, the method according to one aspect of the invention may have one or more of the following complementary characteristics, considered individually or in any technically possible combinations:

The interconnection network is organized as a fat tree;

The fat tree is pruned with redundant links;

The association of the cost tables is carried out by implementing an up-going then down-going propagation;

At least one alternative route of a switch to a computer is produced using a port of the set of groups of ports for this computer and for this switch;

The computer number is linked to the switch to which the computer is connected, each leaf switch, and each group of leaf switches, having a minimum computer number and a maximum computer number, a computer associated with a number between said minimum and said maximum being necessarily connected to said leaf switch or to the group of leaf switches.

The invention and its various applications will be better understood after reading the following description and examining the accompanying figures.

BRIEF DESCRIPTION OF THE FIGURES

The figures are presented for information purposes only and in no way limit the invention.

FIG. 3 shows the steps of the method according to the invention.

DETAILED DESCRIPTION

The figures are presented for information purposes only and in no way limit the invention.

Unless otherwise specified, the same element appearing on different figures shall have a single reference.

Figure 1:
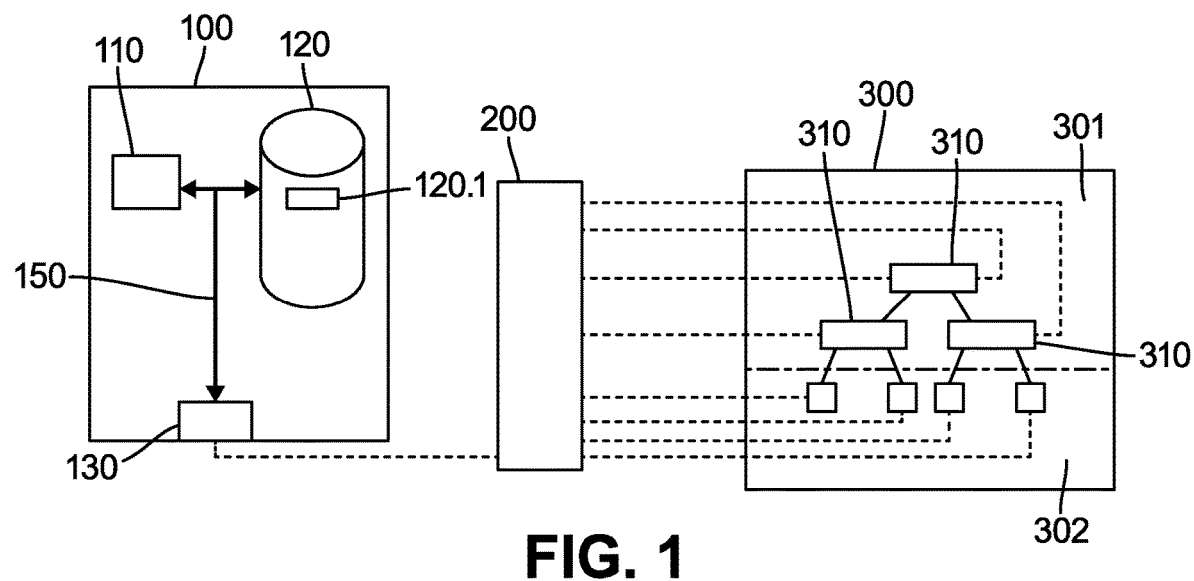
FIG. 1 shows a schematic depiction of the means enabling the implementation of the method according to the invention.

FIG. 1 shows:
A processing device 100;
A management network 200;
A calculation network 300.

The processing device 100, the management network 200 and the calculation network 300 are parts of a supercomputer.

FIG. 1 shows that the processing device 100 comprises:
A microprocessor 110;
Storage means 120;
A communication interface 130.

FIG. 1 shows that the microprocessor of the processing device, the storage means of the processing device and the communication interface of the processing device are interconnected by a bus 150.

In this document, when a step is implemented by a device, this means that a microprocessor of said device executes a sequence of instructions corresponding to this action. This sequence of instructions is recorded on storage means of said device. When said device sends or receives messages, said messages are received or sent by a communication interface of said device.

The processing device 100 is comparable to a physical or virtual computer.

The storage means are for example a storage logical unit. That is to say that they are comparable to a hard disk from the perspective of the user of the processing device. Physically, they can be anything that an operating system, with the appropriate drivers, is capable of having as a disk. This ranges from a simple local hard disk to a remote disk. This may physically be all or part of a cluster of disks. Remote is intended to mean reachable by a telecommunications network.

FIG. 1 shows that the storage means of the processing device 100 comprises several zones, including a zone 120.1 which comprises instruction codes for implementing the method according to the invention.

FIG. 1 shows that the processing device 100 is connected to the management network 200 via the communication interface thereof. Such a management network generally is an Ethernet network, with a throughput of the order of the Gb/s. The case described is that of an out-of-band managed supercomputer. In practice, it is just as common to find management networks materialized in Infiniband or other formats. In practice, in-band managed supercomputers are also found. In the latter case, management network and calculation network are the same.

FIG. 1 shows that the calculation network 300, comparable to a supercomputer, comprises:
An interconnection network 301, and
A plurality 302 of computers, also referred to as compute blades.

The interconnection network comprises a plurality 310 of switches organized according to a predetermined configuration. Such an organization is, for example, a fat tree. Such an organization is also a fat tree pruned with redundant links. This organization family is also known by the name PGFT.

In a tree, a link is redundant if there are several links between the same two switches.

FIG. 1 shows that the switches are connected to one another and to the plurality of computers via the interconnection network. FIG. 1 also shows that the switches of the interconnection network and the computers of the plurality of computers are also connected to the management network. The interconnection network is in general a very-high-throughput network, that is networks in which the throughput is greater than or equal to 40 Gb/s. The links between the plurality of calculation computers and the leaf switches are of the same nature as the links between the switches of the interconnection network.

A distinction is made among switches between those referred to as leaf switches, which are switches to which computers are connected. In this document, it will be stated that the computers are the immediate descendants of leaf switches. The lineage is immediate because there is no intermediate switch between the leaf switch and the computer.

In one embodiment, the method according to the invention is implemented by the processing device 100 which forms part of the supervisory means of the supercomputer. The processing device 100 reads and/or writes the states and configurations of the switches of the interconnection network via the management network.

FIG. 3 shows a step 3010 of association to each switch of the interconnection network and to each computer of the plurality of computers, of a unique identifier. There are several methods for this. It is in fact a question of establishing a topology map of the network, said map being used for the following steps. The stage to which the switches belong is also obtained. The leaf switches are at the weakest stage. Each time a leaf switch is moved away from, a stage is gained. In other words, the stage of a switch is the number of switches it is necessary to use to reach the closest leaf switch. It will thus be possible to associate the results with a unique identifier and write the calculated configurations onto the corresponding devices.

The method then moves to a step 3020 of associating with each switch a cost table. Such a table comprises as many rows as there are leaf switches in the interconnection network. Each line then comprises a leaf switch identifier associated with a cost. A cost is a numerical value. This value represents a number of switches to be used to reach the leaf switch from the switch for which the cost table is calculated. It is possible to carry out this calculation by up-going-down-going stagewise propagation. Such an up-going-down-going is done as follows:

The costs of all the switches to all the leaf switches are initialized at $+\infty$;
The costs of each leaf switch to itself is initialized at 0;
A series of propagations of all the costs is carried out in one stage to the following, first going up, then going down. This means that the method starts and ends with the leaf switches.
At each step, the cost +1 of each switch to all those of the next stage, to which said switch is connected, is propagated;
The propagation is only carried out if the value which is about to be replaced is strictly greater than that which it is desired to propagate.

The fact of starting by going up means that the method starts by processing the leaf switches.

With an interconnection network in a usable state, this step 3020 makes it possible to associate with each leaf switch a final cost to all the other leaf switches. If this is not the case, then that means that the interconnection network cannot be used and the calculation of the routes can be stopped. It is either necessary to intervene in some other way, for example human intervention, to restore the interconnection network to a usable state, or to switch to another appropriate method for the interconnection network in question.

The description of this step corresponds to an embodiment to determine the shortest paths of all switches to all the leaves in a PGFT. There are other methods which make it possible to arrive at the same result, for example implementing Dijkstra's algorithm.

FIG. 3 shows a step 3030 of association, with each switch, of a divisor. This association is performed by implementing the following steps:
The divisors of all the switches are initialized to 1;
The values of the divisors are propagated going up to the upper stages, at each step one level is processed, at each step the following is performed:

The divisor of a switch s multiplied by the number of switches above the switch s is propagated, this propagation being done to the switches immediately above the switch s;

The propagation, that is the modification of the divisor, is only performed if the value which is about to be replaced is less than that which it is desired to propagate.

Figure 2:
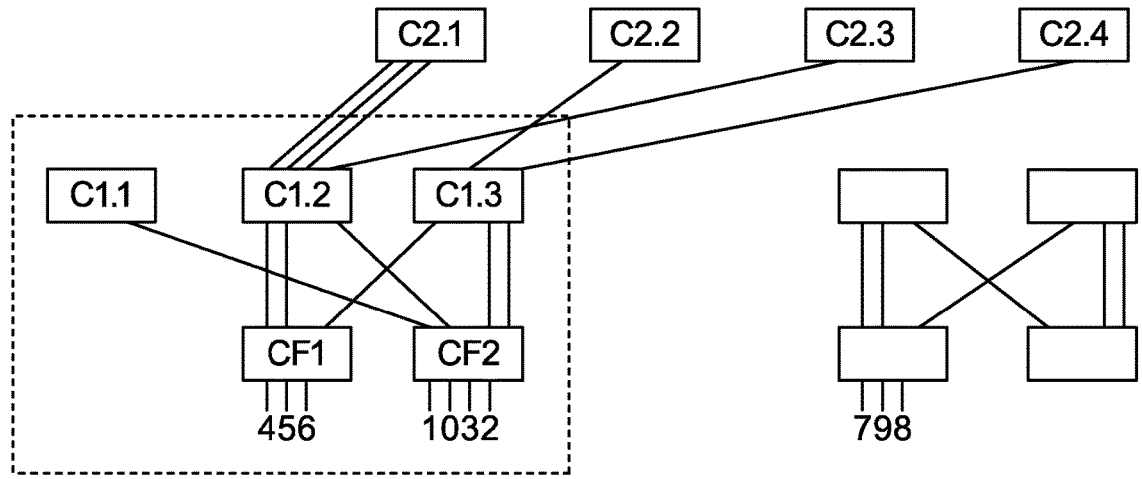
FIG. 2 shows an illustration of a fragment of an interconnection network for the implementation of the method according to the invention.

FIG. 2 shows the implementation of step 3030 of association of a divisor. FIG. 2 shows:

A first leaf switch CF1 connected:
Via 2 links to a switch C1.2;
Via 1 link to a switch C1.3;
A second leaf switch CF2 connected:
Via 1 link to a switch C1.1;
Via 1 link to the switch C1.2;
Via 2 links to the switch C1.3;
That the switch C1.2 is connected:
Via 3 links to a switch C2.1;
Via one link to a switch C2.3;
That the switch C1.3 is connected:
Via 1 link to a switch C2.2;
Via 1 link to a switch C2.4.

In the first step of the divisor association step, a divisor div(switch)=1 is assigned to each switch.

In the second step of the association step, the leaf switch divisors are propagated upward. For the switch CF1 which has 2 switches above it, the switch C1.2 and the switch C1.3. The value 2*1 is thus propagated as divisor of the switch C1.2 and of the switch C1.3. For the switch CF2 which has three switches above it, the value 3*1 is propagated to these switches. Since 3 is greater than 2, these three switches are associated a divisor which has a value of 3.

Once all the switches of a stage have been processed, the method moves to the switches of the following stage. For example, for the switch C1.2 which has 2 switches above it, the value 2*3, that is 6, is propagated to the switches above it.

The divisor associated with a switch is therefore based on the connectivity of the switch which is, in this case, the switches to which said switch is directly connected.

This combination of divisors can be carried out at the same time as the association of the cost tables. In another variant, this divisor can be calculated at the moment of selection of a path, rather than in a preliminary phase. Finally, this divisor may be defined, in one variant, as a median of the products of the numbers of uplinks for all the descents or else with a determination of groups of switches. The definition of a group of switches being, for example, that the sharing of at least one node which can be reached when going down by two switches, involves these two switches belonging to the same group.

In a step 3040 of production of groups of ports, a group of ports being, for a given switch, a list of ports, each of the ports of the list being connected to the same switch. If a given switch is immediately connected to N other switches, then N groups of ports will be produced for it. Once produced, these groups of ports are ordered by switch identifier. The ports inside the groups of ports are ordered by port number.

In a step 3050 of numbering the computers, a discrete number is associated with each computer. In a preferred variant, this number is linked to the switch to which this computer is connected. In a preferred variant, contiguous natural numbers are associated with the computers, such that close computers have close identifiers. This is a question of topological closeness.

In order to obtain these results, the leaves are run through, without going back over the same one twice, first favoring the lowest-cost leaves and then in the order of the unique identifiers. For each leaf run through, each computer connected thereto is assigned the last assigned identifier+1, in the order of the port numbers.

FIG. 3 shows a step 3060 of assigning, for each leaf switch, a deterministic route for each computer connected to the leaf switch. These are the first inputs of the routes to be produced. That is to say that these are the first inputs of the routing tables of the leaf switches. In other words, for each leaf switch, for each computer connected thereto, the corresponding deterministic route is assigned.

FIG. 3 shows a step 3070 of producing, for each non-leaf switch, a routing table. For each non-leaf switch, the following steps are repeated.

FIG. 3 shows a step 3071 of producing a set of groups of ports of the non-leaf switch, the groups of ports being those for which the cost table of the associated switch comprises a row corresponding to the leaf switch for which the cost is strictly less than the cost associated with the same leaf switch in the cost table of the non-leaf switch. In other words, if the non-leaf switch S is processed, for each leaf switch F, the set C of the groups of ports of the switch S are constructed such that the cost of their remote switch to F is strictly less than that of S to F. If the set obtained is not empty, then for each computer connected to the leaf switch, the following sequence of operations is performed:

Selecting 3072 a group of ports from the set of groups of ports previously produced, the group of ports selected having the index equal to $\lfloor d/div(s) \rfloor$ mod #c. In this formula, we have the following:
$\lfloor \ \rfloor$ the integer part,
d the computer identifier,
div(s) the divisor associated with the switch,
c the number of groups in the set.

Selecting 3073 a port from the group of ports previously selected, the port selected having the index equal to $$\left\lfloor \frac{d}{div(s)*\#c} \right\rfloor \mod \#g.$$

In this formula, we have the following:
g the number of ports in the group selected.

Creating 3074 a deterministic route for the computer using the previously selected port.

Finally, once all the switches have been processed, the method moves to a step 3080 of writing the deterministic routes produced into the switches.

The routes produced by the method according to the invention, whether or not in a degraded PGFT, is correct in the sense that all the deterministic and alternative routes lead to their destination without a deadlock and without blockage.

The routes produced by the method according to the invention are minimal, i.e. only shortest paths can be taken. This is true whether or not the network is degraded.

The routes produced by the method according to the invention are predictable and reproducible: each step is deterministic, even working in parallel as may be the case.

The routes calculated by the method according to the invention are well distributed. That is to say that, in a perfect PGFT, using the arithmetic rules described, this routing is equivalent to "Dmodk" and is thus afforded the same guarantees. With a degraded PGFT, the precalculated data is not particularly affected, for example the divisor of a switch will only be affected by exhaustive degradations of equipment beneath itself. The arithmetic routing distribution chosen from the actual shortest paths remains consistent under degradation even if it no longer necessarily guarantees that all the routes to the same destination are grouped together.

By measuring the routing quality with statistical estimations of blockage risk for several classes of communication schemes (and by comparing them to the theoretical congestion factors calculated from the number of links per level, and also to the existing techniques described in the preamble, where applicable), it is observed that they are:

Optimal for non-degraded, or only slightly degraded, PGFTs,

Better than the alternatives for amounts of degradations extending up to much larger scales than those observed in practice.

With the invention, it therefore becomes possible to update all the routes of a supercomputer subject to faults, this updating being sufficiently rapid to not interrupt the applications running: the route determining method can be greatly parallelized once the pre-calculation has been performed. Each step of the pre-calculation can itself be at least partially parallelized. This is possible without losing the routing quality properties, in large part due to the arithmetic nature of the method.

With the invention, if it is desired to produce alternative routing tables for adaptive routing to at least one computer, the ports of the sets of groups of ports are then assigned to the alternative routes of switch S to the at least one computer. This can be done for each computer.

The invention claimed is:

1. A method for establishing communication routes between computers of a supercomputer, the computers being interconnected via an interconnection network comprising a plurality of switches, each switch of the plurality of switches having a unique identifier, each switch comprising a plurality of ports, each port having a discrete number for the each switch, the method comprising:

associating with each computer of said computers and with each switch the unique identifier;

associating, with each switch, a cost table, said cost table comprising a row for each leaf switch, each row comprising a cost corresponding to a number of switches to be used to reach the each leaf switch from the each switch associated with the cost table;

associating, with said each switch, a divisor based on a connectivity thereof;

producing, for said each switch, tables associating a group of ports of the each switch with an identifier of a switch connected to the group of ports, the group of ports being ordered by port number, the group of being ordered by switch identifier;

associating with said each computer said discrete number;

assigning, for said each leaf switch and for said each computer connected thereto, a deterministic route for the each computer;

producing, for each non-leaf switch, a routing table according to:

producing, for said each leaf switch, a set of groups of ports of the non-leaf switch, the set of groups of ports being those for which the cost table of the each switch that is associated with the cost table comprises a row corresponding to the each leaf switch for which the cost is strictly less than the cost associated with a same leaf switch in the cost table of the non-leaf switch, if the set of group ports is not empty then for said each computer connected to the leaf switch selecting a group of ports from the set of groups of ports, the group of ports that is selected having an index obtained by a function $\lfloor d/\text{div}(s) \rfloor \bmod \#c$, with $\lfloor \ \rfloor$ an integer part, d a computer identifier, div(s) the divisor associated with the each switch, #c a number of said groups of ports in the set;

selecting a port in the group of ports that is selected, the port that is selected being obtained by a function $$\left\lfloor \frac{d}{\text{div}(s) * \#c} \right\rfloor \bmod \#g,$$

with #g a number of ports in the group of ports that is selected;

creating a deterministic route of the non-leaf switch to the each computer using the port that is selected;

writing the deterministic route into the each switch of said plurality of switches.

2. The method for establishing communication routes according to claim 1, wherein the interconnection network is organized as a fat tree.

3. The method for establishing communication routes according to claim 2, wherein the fat tree is pruned with redundant links.

4. The method for establishing communication routes according to claim 1, wherein the associating with said each switch the cost table is done by implementing an up-going then down-going propagation.

5. The method for establishing communication routes according to claim 1, wherein at least one alternative route of a switch to a computer is produced using a port of the set of groups of ports for this computer and for this switch.

6. The method for establishing communication routes according to claim 1, wherein the discrete number of said each computer is linked to the each switch to which the each computer is connected, said each leaf switch, and each group of leaf switches, comprising a minimum computer number and a maximum computer number, a computer of said computers associated with a number between said minimum number and said maximum number being necessarily connected to a leaf switch of said each leaf switch or to a group of leaf switches of the each group of leaf switches.

* * * * *